(12) United States Patent
Kuo et al.

(10) Patent No.: US 9,981,637 B2
(45) Date of Patent: May 29, 2018

(54) COOLANT MEASUREMENT APPARATUS AND METHOD

(71) Applicants: Alexander Kuo, Dallas, TX (US); James H. Monti, Jr., Plano, TX (US)

(72) Inventors: Alexander Kuo, Dallas, TX (US); James H. Monti, Jr., Plano, TX (US)

( * ) Notice: Subject to any disclaimer, the term of this patent is extended or adjusted under 35 U.S.C. 154(b) by 60 days.

(21) Appl. No.: 15/045,242

(22) Filed: Feb. 16, 2016

(65) Prior Publication Data

US 2017/0232940 A1    Aug. 17, 2017

(51) Int. Cl.
*B60S 5/00* (2006.01)
*G01K 1/14* (2006.01)
*G01K 1/02* (2006.01)
*B60H 1/32* (2006.01)

(52) U.S. Cl.
CPC ............... *B60S 5/00* (2013.01); *G01K 1/024* (2013.01); *G01K 1/14* (2013.01); *B60H 2001/3255* (2013.01)

(58) Field of Classification Search
CPC ... B60S 5/00; G01K 1/14; G01K 1/02; G01K 1/024; B60H 2001/3255
See application file for complete search history.

(56) References Cited

U.S. PATENT DOCUMENTS

| | | | | |
|---|---|---|---|---|
| 3,100,391 A * | 8/1963 | Mansfield | ............... | F01P 11/00 374/143 |
| 3,635,086 A * | 1/1972 | Beruck | ................. | G01K 13/02 374/148 |
| 4,772,132 A * | 9/1988 | Hofmann | ............... | G01K 13/02 374/143 |
| 5,295,747 A * | 3/1994 | Vinci | ....................... | F01P 11/14 374/145 |
| 5,324,114 A * | 6/1994 | Vinci | ....................... | F01P 11/14 374/145 |
| 5,741,069 A * | 4/1998 | Egel | ......................... | G01K 1/14 123/41.15 |
| 6,675,829 B2 * | 1/2004 | Moore, Jr. | ............... | F01P 11/00 137/327 |
| 8,682,526 B2 * | 3/2014 | Mola | .................. | B60H 1/00735 62/181 |
| 2003/0158704 A1* | 8/2003 | Triginai | ............. | B60H 1/00585 702/182 |
| 2007/0294005 A1* | 12/2007 | Kerschl | .............. | B60H 1/00978 701/36 |
| 2009/0113901 A1* | 5/2009 | Carrubba | ........... | B60H 1/00585 62/77 |
| 2011/0137522 A1* | 6/2011 | Mola | .................. | B60H 1/00735 701/36 |

\* cited by examiner

*Primary Examiner* — Nicolas A Arnett

(57) ABSTRACT

An apparatus and method for measuring coolant temperature to ensure the proper amount of coolant for refilling or servicing a coolant system, such as an automobile coolant system, are disclosed. In one embodiment, the apparatus includes a measurement display for viewing the temperature of air conditioning output inside a vehicle while the user is outside the vehicle refilling or servicing a coolant system. The measurement display is in communications with a temperature sensor measuring the air temperature at a vent inside the vehicle to allow a user to ensure the proper amount of coolant is refilled.

4 Claims, 7 Drawing Sheets

COOLANT MEASUREMENT APPARATUS AND METHOD

BACKGROUND

The apparatus and method disclosed herein relates to a coolant measurement device for use in refilling or servicing a coolant system, such as an automobile coolant system. The coolant measurement device may be used with a bottle actuator assembly designed to operate in conjunction with a pressurized bottle, such as a refrigerant bottle. Additionally, the apparatus and system allows a non-professional to easily measure the temperature of the air conditioning vent air temperature while refilling to ensure that sufficient coolant has been filled.

Typical coolant systems, such as those found in an automobile air conditioner, include three main components—a compressor, a condenser, and an evaporator. A compressor is a pump driven by a belt attached to the engine's crankshaft. Refrigerant is drawn into the compressor in a low-pressure gaseous form. Once inside the compressor, a belt drives the pump pressurizing the gas which thereby gets hot by absorbing the surrounding heat.

Conversely, as the pressure of the gas decreases, the gas temperature decreases. This expansion of the refrigerant gas in a coolant system acts to cool the system containing the refrigerant. Air is then blown over the cooled system into the cabin of the automobile.

In such an air conditioning unit, the ability of cooling provided using the compression and expansion of a gaseous refrigerant will vary depending on the level of refrigerant present in the system. For numerous reasons, refrigerant may slowly leak from the air conditioning system. As such, an automobile air conditioning system may require routine monitoring of the refrigerant level or pressure and periodic re-charging the refrigerant.

To allow re-charging of the refrigerant, automotive air conditioners are generally provided with a service port to permit the addition of refrigerant as well as to permit the inspection of the level of refrigerant in the system. Although such re-charging and inspection is typically performed by service professionals, a significant number of automobile owners prefer to perform routine maintenance on their own vehicles, in part due to the savings obtained.

One standard tool used by service professionals for re-charging refrigerant and measuring pressure or other parameters in automobile air conditioners is a set of manifold gauges. This tool typically includes three hoses and two gauges; wherein one hose connects to a low pressure service port; one hose connects to a high pressure service port; and a third hose connects to the source of refrigerant. The gauges are then used to measure the pressure at the service ports. Although manifold gauges may be a standard tool used by service professionals, a number of disadvantages may reduce their popularity among general consumers. These disadvantages include: being complicated to use; requiring the user to know the approximate ambient temperature; requiring a user to look up the pressure readings of the gauges on a chart to determine if there is sufficient refrigerant in the system; presenting a high up-front costs of equipment that is infrequently used. An innovative way for providing a re-charging of refrigerant and measuring the pressure of coolant systems using an adaptable bottle actuator assembly capable of interoperating with various forms of pressurized bottles is described in U.S. patent application Ser. No. 14/680,066, the specification of which is incorporated by reference.

Prior art systems disclose methods and devices for measuring the temperature of the coolant in the engine. However, for most non-professionals, this remains a difficult task. Additionally, measuring temperature of the coolant at the service port is not reliable for all vehicles. Accordingly, there is a need for replacing traditional measuring gauges which are difficult to use as the user must know the ambient temperature. Furthermore, there is also a need to replace gauges that measure the temperature and/or pressure at the port of refilling as different makes and models of vehicles may have different temperatures and/or pressures for a user to be aware of. Therefore, there is a need to measure the temperature at the vehicle air conditioning vents to ensure that the sufficient coolant has been filled in the coolant system.

Various apparatus and system embodiments of the present invention may be used that are adaptable to a bottle actuator assembly for use with various pressurized bottles. Embodiments of the present invention allow a consumer to determine the sufficiency of the refrigerant level in an automobile air conditioner, and to add refrigerant as needed. Additional advantages of embodiments of the invention are set forth, in part, in the description which follows and, in part, will be apparent to one of ordinary skill in the art from the description and/or from the practice of the invention.

SUMMARY OF THE INVENTION

An apparatus and method for measuring the proper amount of coolant for refilling or servicing a coolant system, such as an automobile coolant system, are disclosed. The invention provides a device for measuring the temperature of the air conditioner at a vent inside the vehicle to ensure the proper amount of coolant is refilled while the user is refilling or servicing a coolant system from outside the vehicle. A display is preferably disposed within a housing for operation with a bottle actuator assembly for a pressurized bottle. The display is in communication with a temperature sensor securely attached to an air conditioner vent inside the vehicle.

In another aspect, the temperature sensor is connected to the display via an electrical wire. The display housing preferably includes a recessed portion for storage of the electrical wire.

In another aspect, the display informs a user refilling or servicing the coolant system that the proper amount of coolant has been refilled by indicating that the air conditioner output inside the vehicle has reached the desired temperature.

DETAILED DESCRIPTION

Figure 1:
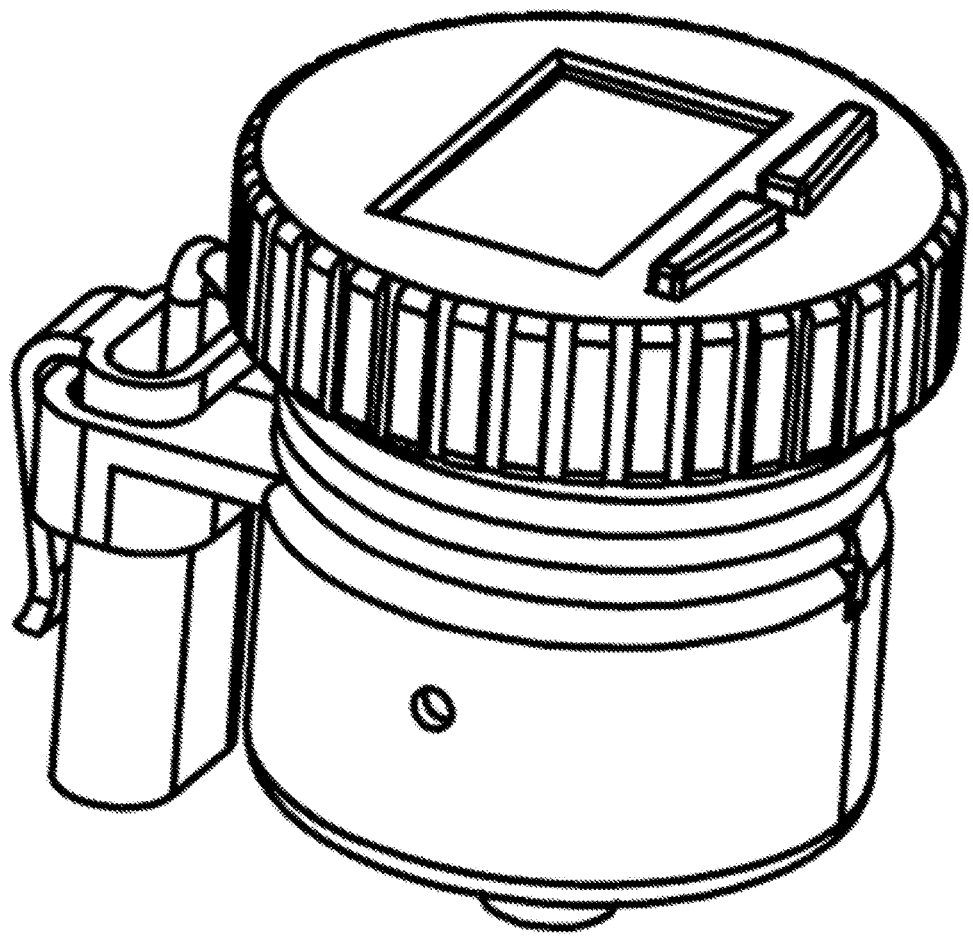
FIG. 1 is a perspective view of a coolant temperature measurement device in accordance with the invention.

While the inventions disclosed herein are susceptible to various modifications and alternative forms, specific embodiments are shown by way of examples in the drawings and described in detail. It should be understood that the figures and detailed description discussed herein are not intended to limit the invention to the particular forms disclosed. On the contrary, the intention is to cover all modifications, equivalents and alternatives falling within the spirit and scope of the present inventions as defined by the appended claims. Description will now be given of the invention with reference to FIGS. 1-7.

Figure 2:
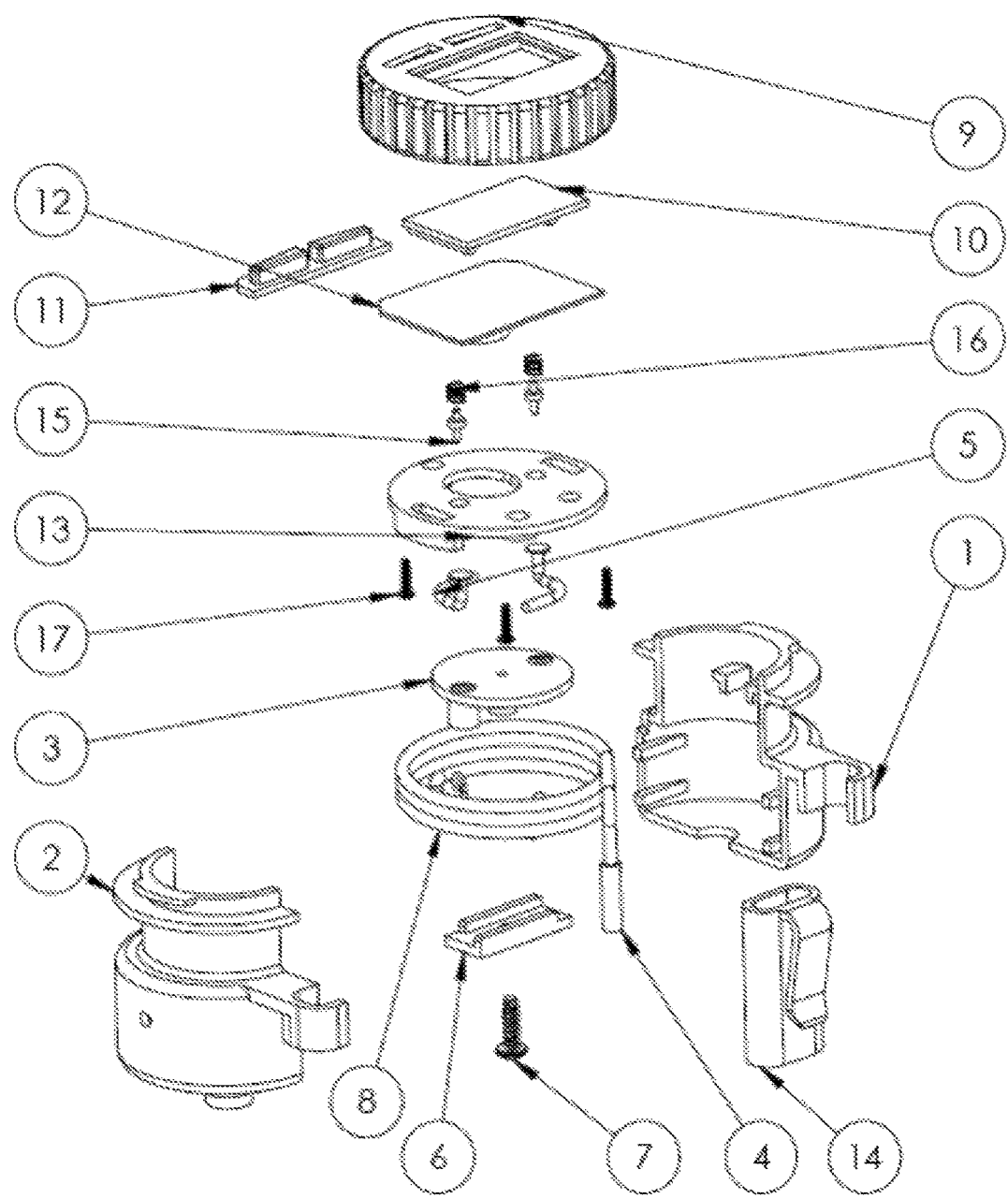
FIG. 2 is a perspective view of the individual components of the coolant temperature measurement device in accordance with the invention.

As shown generally in FIGS. 1 and 2, the inventive coolant temperature measurement device 100 operable with a bottle assembly for use with pressurized coolant bottles and puncture top bottles preferably includes a number of easily manufactured and assembled components. In an exemplary embodiment, the coolant temperature measurement device housing may be composed of two easily fabricated cup halves 1, 2. In the exemplary embodiment, a digital display in operation with a digital temperature sensor is disclosed, however any temperature sensor may be substituted. The exemplary embodiment includes a display cap 9, a display 10, buttons 11, printed circuit board (pcb) 12, pcb retainer 13, contact frame 3, contact 5, clamp 6, and various screws, pins and springs 7, 15, 16, 17 to fix the components in the cup halves 1, 2.

In the exemplary embodiment, the coolant temperature measurement device also includes a temperature sensor 4 in electrical communication via a wire 8. The temperature sensor 4 is housed in a clip 14 for attachment to an air conditioner vent. A temperature sensor in accordance with the invention may also communicate with the coolant temperature measurement device by other means, including adapted to communicate wirelessly without departing from the spirt of the invention.

As shown in FIG. 2, the coolant temperature measurement device is preferably constructed from a number of easily replicable and interchangeable components.

Figure 3:
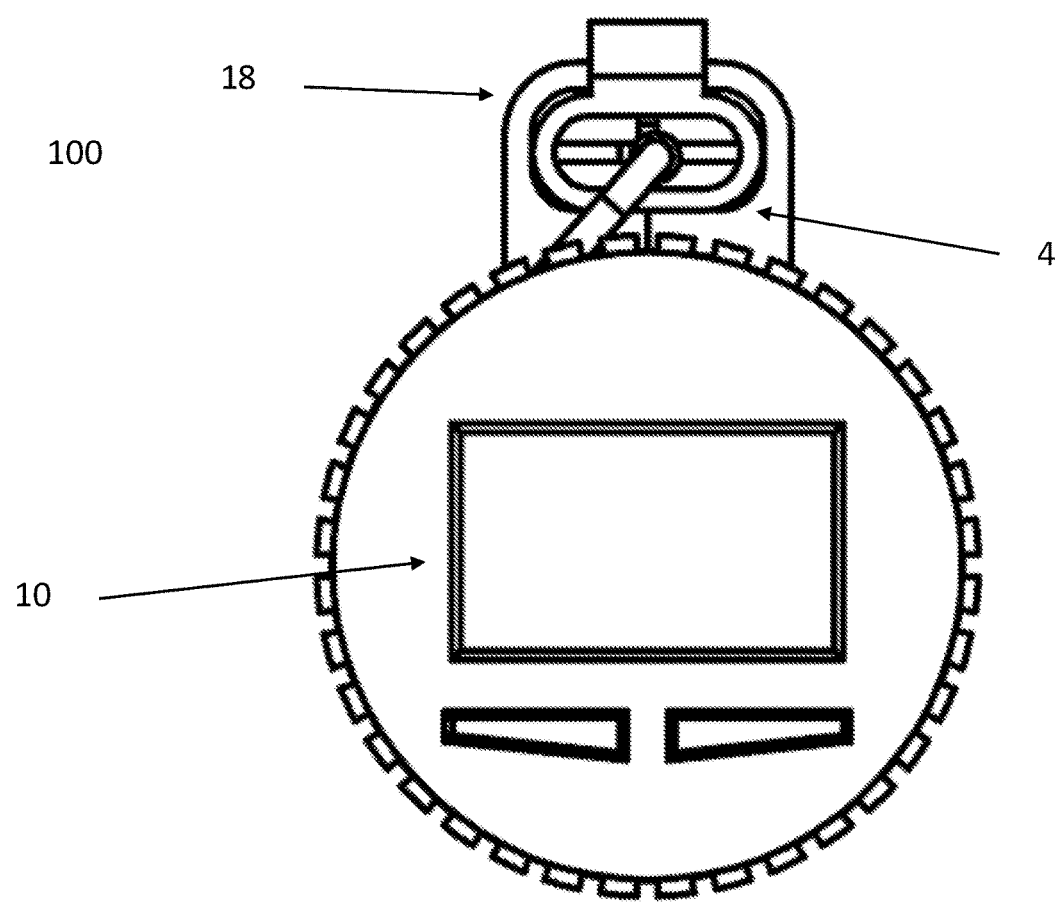
FIG. 3 is a top perspective view of a coolant temperature measurement device in accordance with the invention

As show in the top view of FIG. 3, the exemplary coolant temperature measurement device 100 includes a display 10. Display 10 is preferable a digital display for ease of reading by a user. However, as discussed above an analog display may be substituted as well. The housing halves 1, 2 includes a holder 18 for storing the temperature sensor 4 and vent clip 14.

Figure 4:
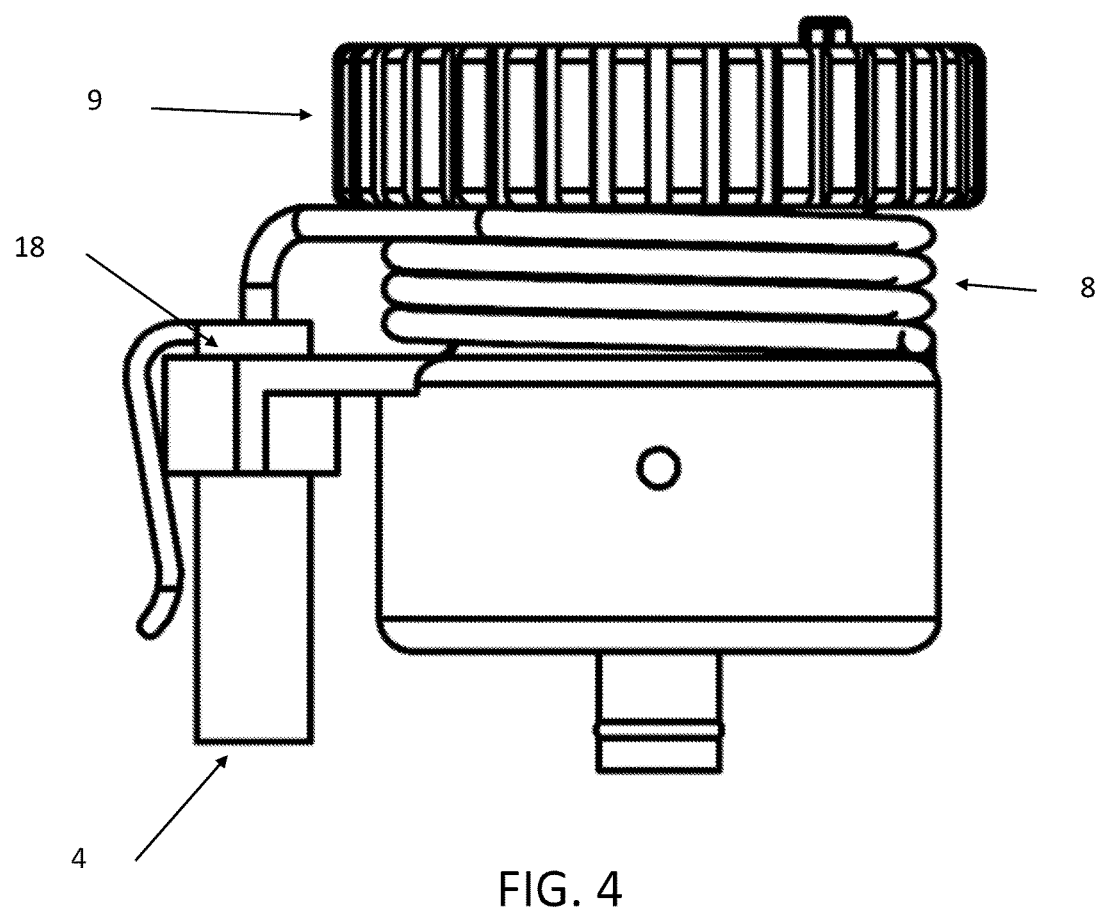
FIG. 4 is a side perspective view of the coolant temperature measurement device in accordance with the invention.
Figure 5:
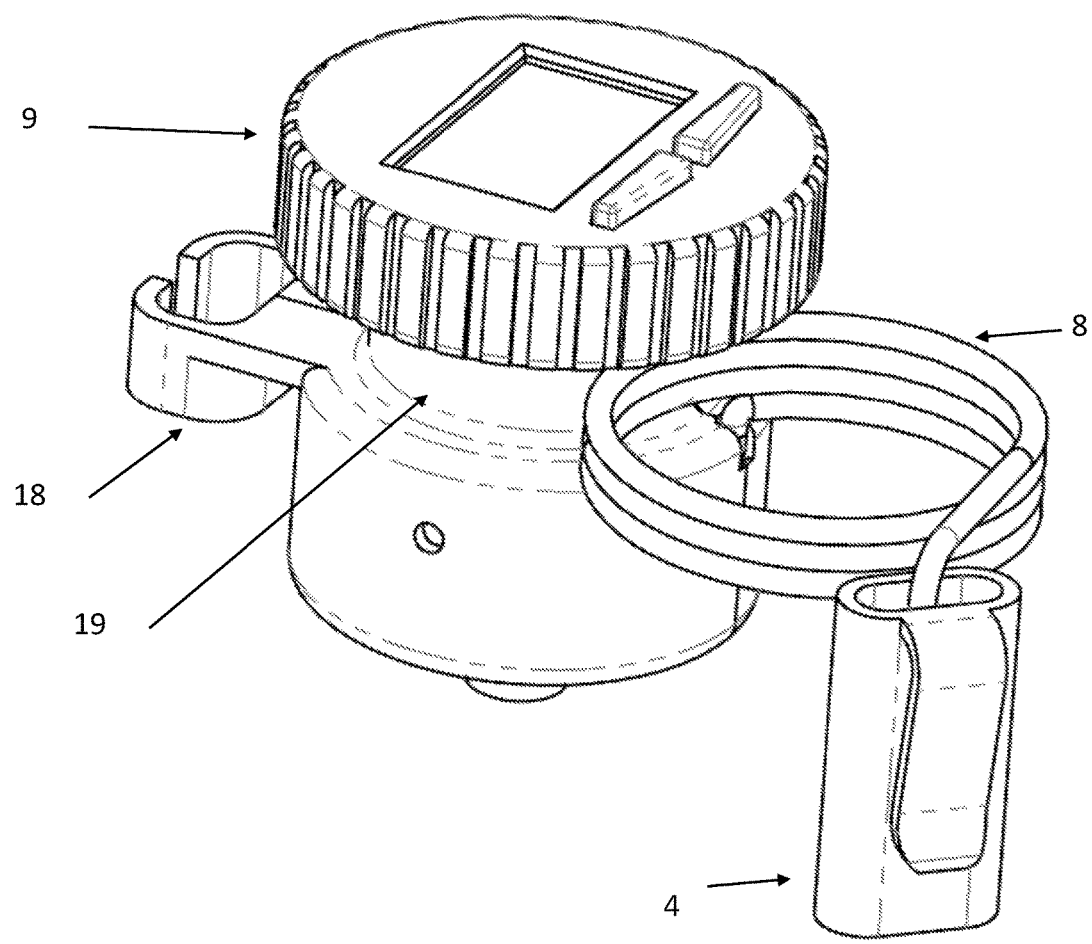
FIG. 5 is a perspective view of the coolant temperature measurement device with the measuring gauge detached.

As shown in FIGS. 4 and 5, in the exemplary embodiment the temperature sensor 4 is in electrical communications with the coolant temperature measurement device 100 via wire 8. The housing halves 1, 2 preferably includes a recessed portion 19 which allows for storage of wire 8 by easily winding wire 8 around the recessed portion 19 of housing halves 1, 2. The recessed portion 19 is preferably located below the display cap 9. In an alternate embodiment, wire 8 may be stored within the housing using a spring wound configuration.

Figure 6:
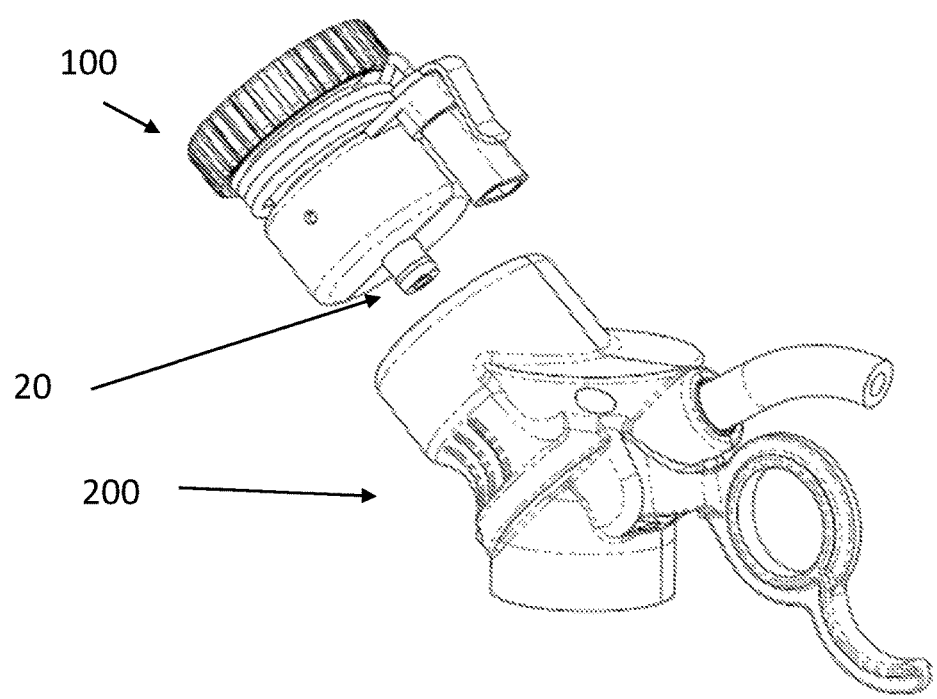
FIG. 6 is a perspective view of the coolant temperature measurement device in operation with a bottle actuator.

FIG. 6 depicts the exemplary coolant temperature measurement device in operation with a bottle actuator assembly. The housing preferably includes connector 20 for insertion into a bottle actuator assembly 200 having port for receiving connector 20. Although preferably attached to a bottle actuator assembly 200, it is not necessary for the coolant temperature measurement device to be physically adjoined to a bottle actuator assembly 200.

Figure 7:
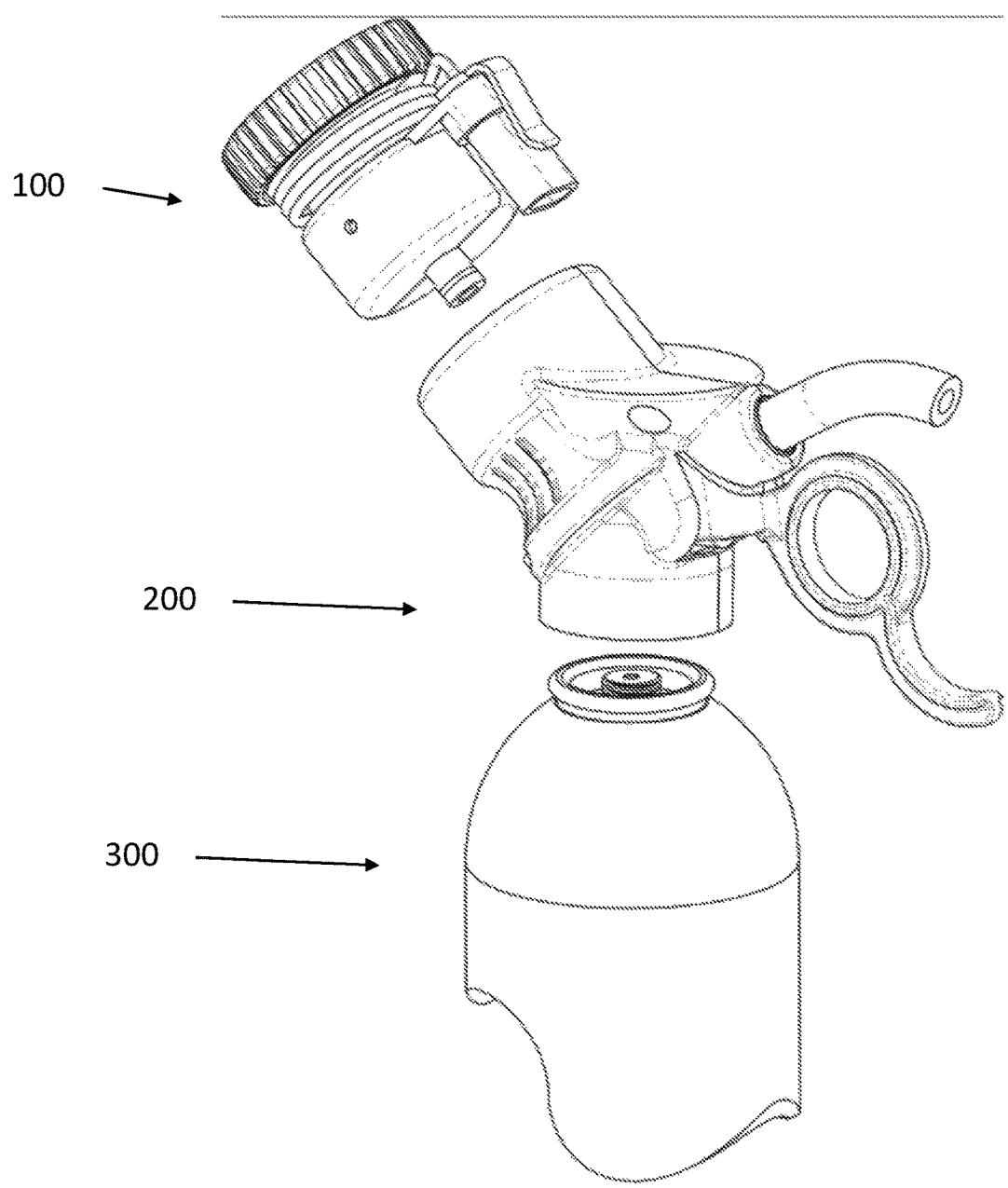
FIG. 7 is a perspective of the coolant temperature measurement device in operation with a bottle actuator assembly device in accordance with the invention operating with a internal valve top bottle.

FIG. 7 further depicts the exemplary coolant temperature measurement device 100 in operation with a bottle actuator assembly 200 in receipt of a pressurized bottle 300. The bottle actuator assembly 200 includes an actuation level when opening flow between the coolant system and the refrigerant bottle 300. A thorough discussion of this process is incorporated by reference from U.S. patent application Ser. No. 14/680,066.

These and other modifications to the above-described embodiments of the invention may be made without departing from the intended scope of the invention.

What is claimed is:

1. A method for servicing a vehicle coolant system, the method comprising:
   filing refrigerant, at a coolant port;
   obtaining via a temperature sensor, at an air conditioning vent inside the vehicle, an indication of temperature of the vehicle air output;
   receiving at an indicator, near a coolant port outside the vehicle, the indication of the sufficiency of refrigerant in the vehicle coolant system temperature based on a measurement of the temperature received from the temperature sensor; and
   terminating filling refrigerant, at the coolant port, when the measurement of the temperature received from the temperature sensor reaches a predetermined threshold.

2. The method of claim 1, wherein receiving, the indication of temperature of the vehicle air output is accomplished via a wireless or wired interface.

3. The method of claim 1, wherein the indication of temperature of the vehicle air output is a numeric value.

4. The method of claim 1, wherein terminating filling refrigerant further comprises the measurement of the vehicle air output temperature reaching a predetermined threshold temperature or temperature range.

* * * * *